United States Patent [19]
Mongredien

[11] 3,731,561
[45] May 8, 1973

[54] MECHANISM FOR SEVERING AND SIMULTANEOUSLY STRIPPING WIRES COVERED BY A SHEET

[75] Inventor: Emile R. Mongredien, Epinay-sur-Seine, France

[73] Assignee: La Telemecanique Electrique, Marechal Joffre Namterre (Hauts-de-Seine), France

[22] Filed: May 25, 1971

[21] Appl. No.: 146,757

[52] U.S. Cl. ................................................81/9.5 A
[51] Int. Cl. ...............................................H02g 1/12
[58] Field of Search ..........................81/9.5 A, 9.5 R, 81/9.51

[56] References Cited
UNITED STATES PATENTS 3,125,909   3/1964   Hindenburg.........................81/9.5 A
3,311,001   3/1967   Gallagher et al. ...................81/9.5 A Primary Examiner—Granville Y. Custer, Jr.
Assistant Examiner—Roscoe V. Parker
Attorney—Waters, Roditi, Schwartz & Nissen

[57] ABSTRACT

The invention discloses a mechanism, for incorporation into a hand-operated tool, for severing, and stripping the ends of, a sheath-covered wire, e.g. an insulated electric conductor. Two cammed handles push a movable block towards a stationary block, the former having a central severing blade and two lateral stripping knives registrable with lateral knives on the stationary block. After cutting the sheath, a lost-motion connection between the handles and the movable block causes the movable knives to pivot outwardly and to expel the stripped ends of the severed wire. The invention enables the simultaneous severing, and stripping the severed ends of, a wire anywhere along its length.

12 Claims, 8 Drawing Figures

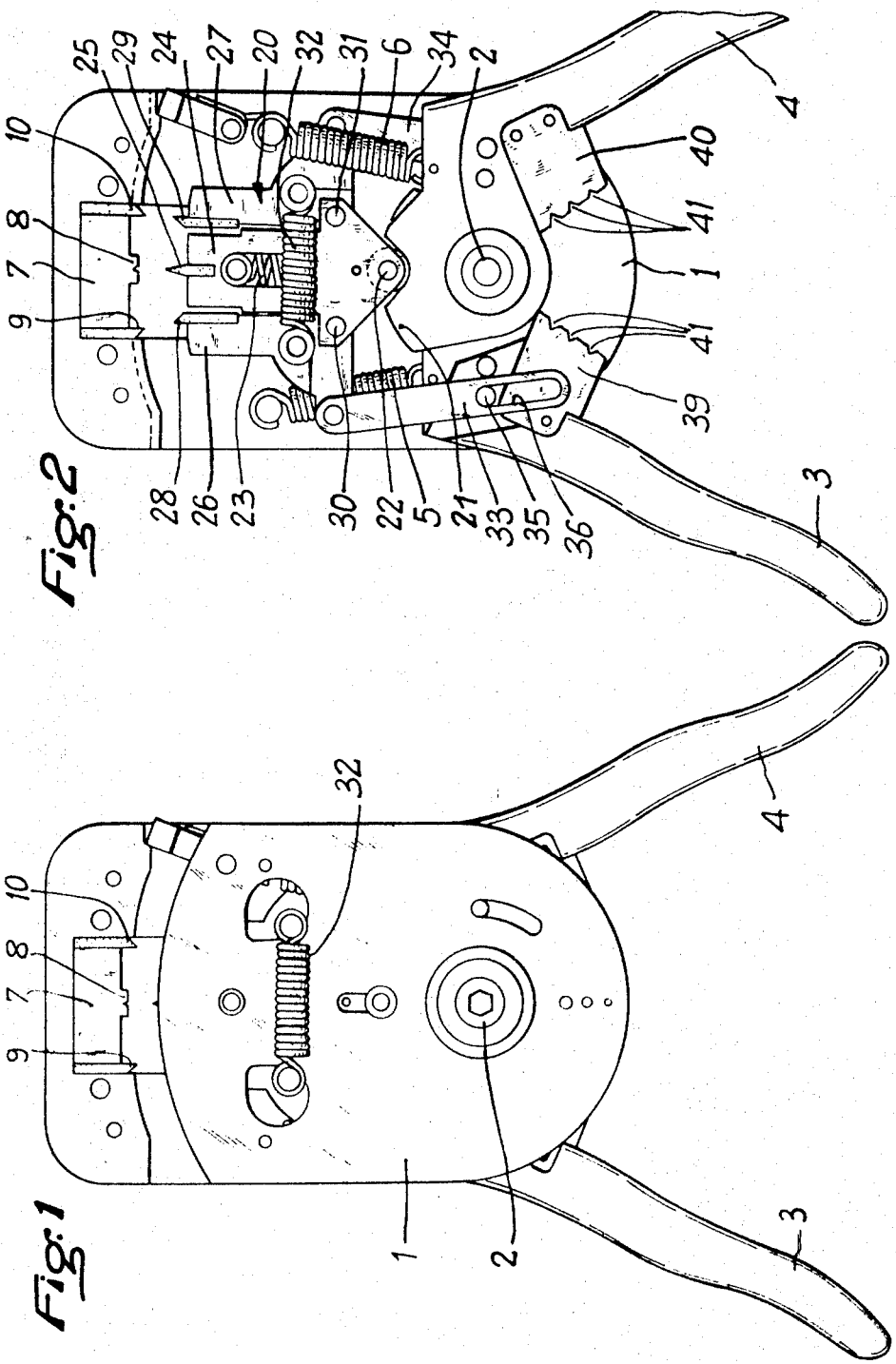

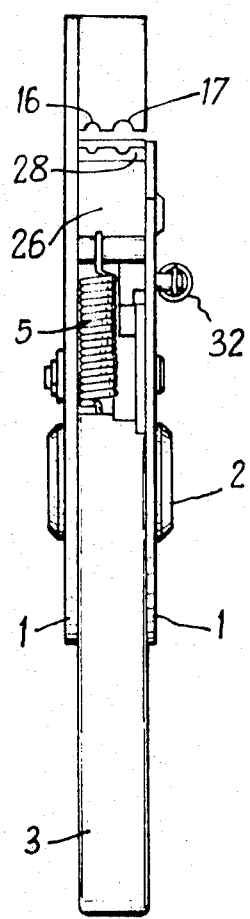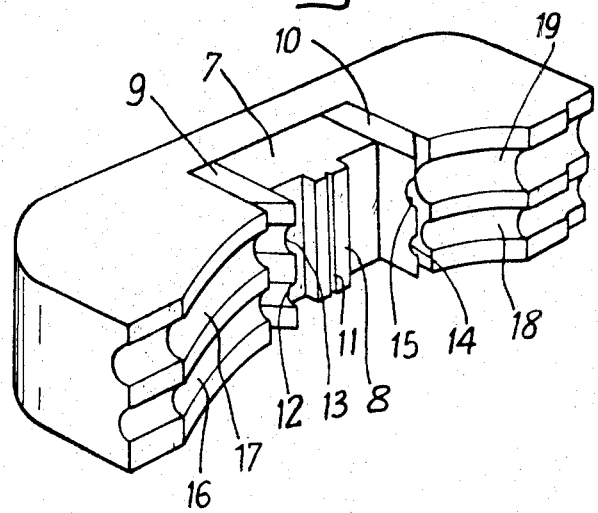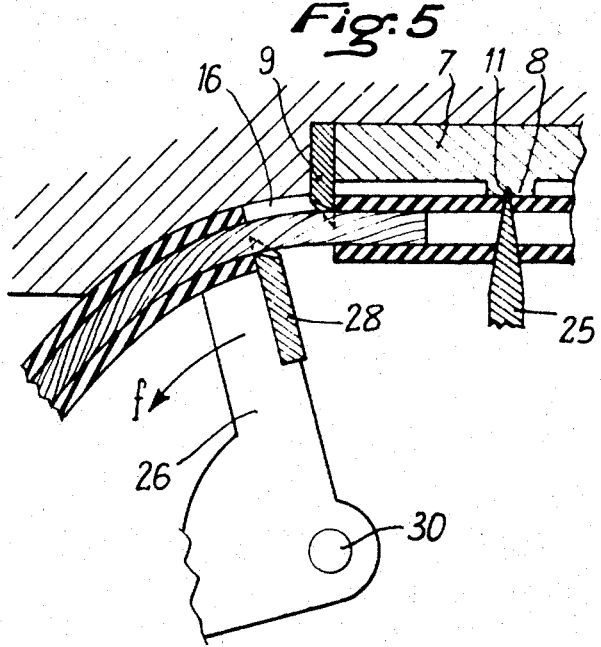

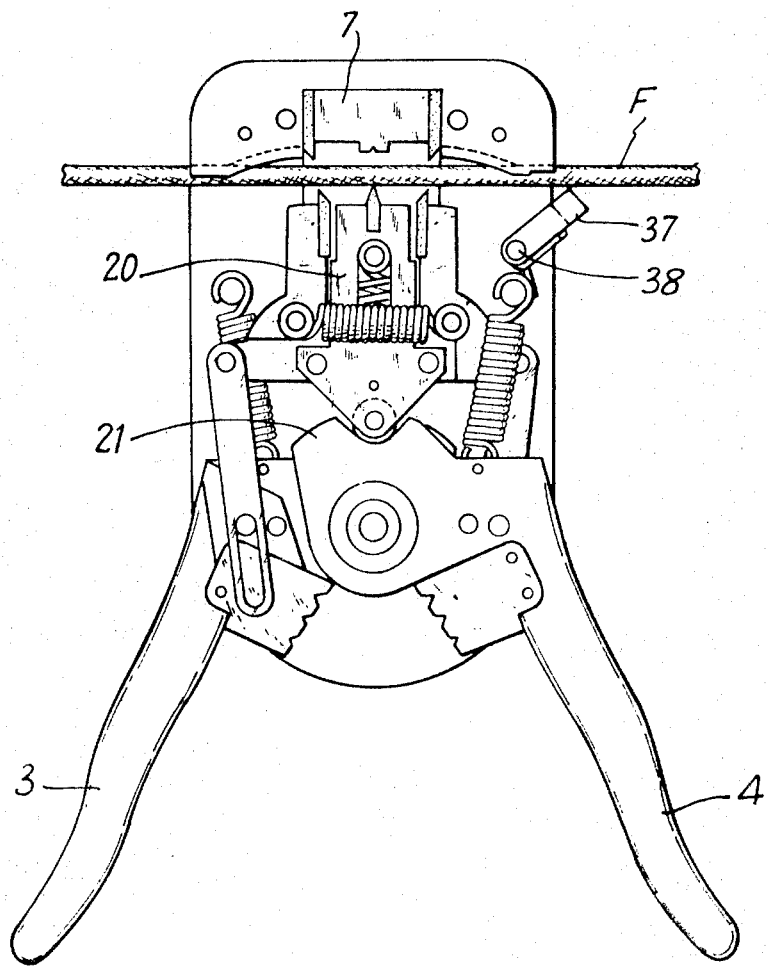

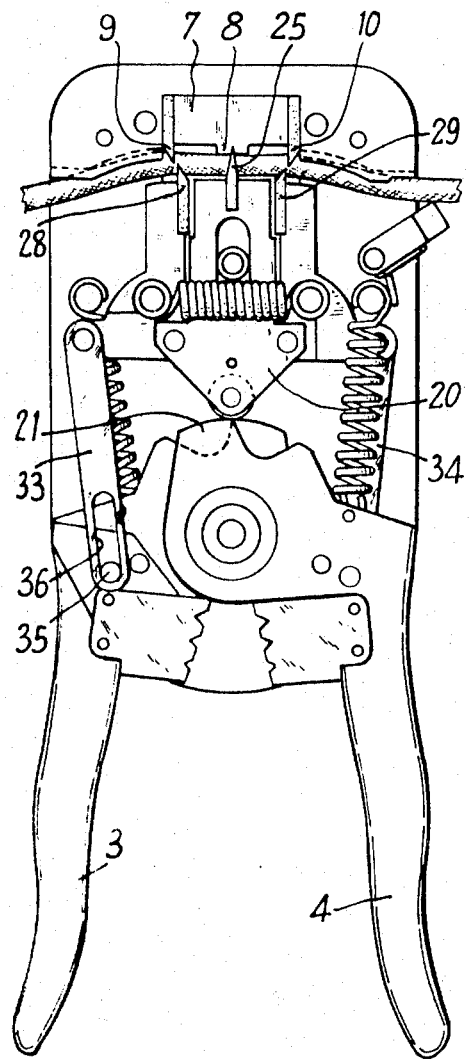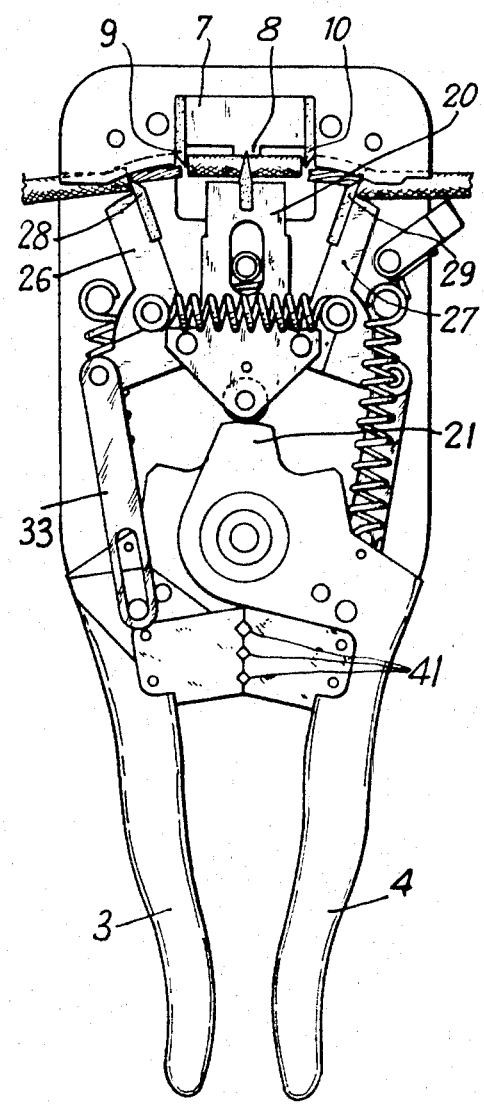

MECHANISM FOR SEVERING AND SIMULTANEOUSLY STRIPPING WIRES COVERED BY A SHEET

This invention concerns a mechanism serving to sever, and simultaneously to strip the ends of, a wire covered in a sheath, such as an insulated electric wire. This mechanism is particularly, but not exclusively, useful for mounting on a hand-gripped pliers-like tool.

Known mechanisms for facilitating the stripping of electric wires are in fact generally incorporated in hand-gripped tools. U.S. Pat. No. 3,125,909 describes one of these mechanisms. However, known hand-gripped tools are designed to strip a free end of an already severed wire, which necessitates two consecutive operations by stripping each free end after having previously effected a severing or cutting of the electric wire to its desired length.

The principal object of the invention is to provide mechanism capable of severing an insulated wire at any desired location along its length and of simultaneously stripping the two ends of this wire adjacent the plane of severing.

A secondary object of the invention is to provide a tool capable of severing and stripping two spaced apart ends of an insulated wire by the provision of a unique approaching movement between the handles of the tool held in the same hand.

Another object of the invention is to provide a pliers-like tool permitting the severing and stripping of the ends of insulated wires having different sizes.

A supplementary object of the invention is to provide a hand-gripped tool capable of severing and stripping an insulated wire at any point along its length but which allows also, if desired, the stripping of an end portion of an insulated wire which has already been previously severed.

Other objects of the invention, as well as its advantages, will appear in the course of the description given below.

According to one aspect of this invention, there is provided a mechanism for severing and simultaneously stripping a wire covered with a sheath, comprising a support, a stationary shearing block rigidly secured to the support, a pair of spaced apart severing elements on the stationary block, a movable shearing block capable of movement into wire-gripping engagement with the stationary block and away therefrom, a cutting element on the movable block to sever the wire, a pair of spaced apart stripping elements mounted on the movable block for movement therewith and for movement relative thereto, biasing means for tending to prevent the relative movement of the stripping elements, actuating means on said support for effecting the movement of the movable block, and means for connecting the actuating means with the said stripping elements in such a way that during the movement of the movable block into the wire-gripping and the severing engagement with the stationary block no relative movement of said stripping elements takes place, but thereafter the stripping elements are caused to move relative to the movable block in a direction away from said cutting element to strip the ends of the severed wire.

According to another aspect of this invention, there is provided a hand-operated wire cutting and stripping tool incorporating a mechanism as set forth above, the tool further including a pivot on which is mounted a pair of biased-apart handles.

A purely exemplary, non-limitative description of a mechanism constructed for incorporation into a hand-gripped pliers-like tool will now be given with reference to the attached drawings, in which:

FIG. 1 is a side view of a tool incorporating a mechanism according to this invention shown at rest;

FIG. 2 is a view similar to FIG. 1 but showing the inside of the mechanism at rest;

FIG. 3 is an edgewise view of the pliers-like tool of FIG. 1;

FIG. 4 is an enlarged perspective detail view showing the stationary shearing block of the same tool;

FIG. 5 is a schematic view serving to explain the mode of action of the tool of FIGS. 1 to 4; and FIGS. 6, 7 and 8 are views similar to FIG. 1 showing the pliers-like tool in three successive positions of severing, and stripping the severed ends of, an insulated wire at any point along its length.

Reference will first be made to FIGS. 1 to 4 for describing the construction of the pliers-like tool. It includes a general support 1 consisting of two small plates spaced apart by cross-pieces and assembled together by screws.

A pivot pin 2, capable of serving at the same time as a spacer and as a fastener for the plates, is carried by the support 1. Two opposite handles 3, 4 are pivotally mounted on the pivot pin 2. Two springs 5, 6, each secured between one handle and the support 1, serve as biasing means tending to separate the handles 3, 4.

A stationary shearing block 7 is attached to the support 1 and is spaced from the pivot pin 2, the block 7 presenting towards the pin 2 a central anvil 8 and two severing elements in the form of knives 9, 10 spaced from, and on either side of, the anvil. The latter constitutes cutting means cooperating with a cutting element or blade 25 to be described later in more detail. FIG. 4 shows clearly that the central anvil 8 has a transverse groove 11 and that, in this example, the knives 9 and 10 each constitute a pair of cutters each having two respective semi-circular cutting edges 12, 13 and 14, 15 capable of severing half the circumference of sheaths of different diameters, without, however, cutting the electric conductor.

The stationary block 7 is extended on both sides of the knives 9, 10. In the internal faces of the extensions of the block 7 are provided guiding grooves 16, 17 and 18, 19 running from the knives, more precisely from each cutting edge 12, 13 and 14, 15, which grooves extend along the stationary block. The grooves 16 to 19 terminate at the end faces of the extensions of the block 7. At least along a portion of their length, beginning from the cutting edges 12, 13 and 14, 15, the grooves 16 to 19 have, in the longitudinal direction, an arcuateness of predetermined curvature, visible on the Figures, and which will be further described hereafter.

A movable shearing block designated by the general reference number 20 is guided between the plates of the support 1 with a capability of movement towards and away from the stationary block 7. So that one can control the displacement of the movable block 20 with the aid of the handles 3, 4 a movement-transmitting means is disposed between the handles 3, 4 and the block 20. This means may be constructed according to any one of numerous variants such as: a crank tie-rod, an eccentric, a rack and pinion, etc.

In the illustrated example, this means is, however, constituted by a pair of cams 21 each being an extension of the associated handle. The cams 21 are symmetrically disposed, as are the handles, about a central vertical (as viewed) line. In addition, the movable block 20 is provided with a follower element, such as a roller or pulley, mounted on an arbor 22 adapted to be pressed against the camming surfaces of the cams 21. A spring 23 lodge in a hollow in the movable block 20 and pressed against both the block 20 and a screw fixed to the support 1 biases the block 20 towards the cams 21.

The movable block 20 includes a central body 24 equipped with the earlier-mentioned cutting element or blade 25 pointing towards the transverse groove 11 of the anvil 8, and with two side arms 26, 27 each having at one end a knife 28, 29 or more exactly, in this example, a pair of knives with semi-circular cutting edges which can register with the knives of the stationary shearing block 7.

The central body 24 carries two pivot pins 30, 31 and each arm 26, 27 is pivotally mounted around one of the pivot pins at its end opposite the end carrying the associated knife. A spring 32 secured to each arm tens to keep the arms 26, 27 pressed against the body 24. Also, each arm 26, 27 is connected to an associated handle 3, 4 by means of a respective connecting element 33, 34 having a movement comprising a first, idle stroke and a second, active stroke during which latter the movement of each handle 3, 4 is transmitted to the associated arm.

Here, too, numerous equivalent means may be adopted as a connecting element. In this example, there are two tie-rods or struts 33, 34 each pivoted by means of pivot pins 35 on the one hand on one arm and on the other hand on a handle. The pivot pins 35 are introduced into respective elongated slots 36 formed in the respective struts 33, 34 such that pivot pins do not begin to entrain the struts until the pins reach the bottom ends of the slots 36 when the handles 3, 4 are moved towards each other. Parts 37, 38 will be described somewhat later (see FIG. 6).

In addition, the handles 3, 4 are equipped with two opposing jaws 39, 40 (see FIG. 2) which are formed with half-openings 41 of varying sizes, for a reason to be described below.

The role of the different parts described above, as well as the operation of the wire cutting an stripping mechanism of this invention, will now be explained with reference to FIGS. 5 to 8.

To sever, and strip the ends of, an insulated wire F, the latter is introduced into the tool, as shown in FIG. 6, by placing it in the grooves 16, 18 or 17, 19 and in those semicircular cutting edges 12, 14 or 13, 15 which correspond to the size of the wire F.

A finger 37 (see FIG. 6) which is not strictly necessary for the proper operation of the mechanism, is mounted on the support 1 by way of a pivot pin 38; this finger is of square section and is biased by a spring in a manner such that one of its edges is pressed against the grooved face of the extension of the block 7. The finger 37 aids in retaining the insulated wire F in its receiving groove.

The profile of the cams 21 is designed so that when the handles 3, 4 are squeezed together, in the first part of their mutually approaching movement, the cams 21 play an active role in the course of which they push the movable shearing block 20 towards the stationary block 7. This active role of the cams 21 ceases when the cutting blade 25 reaches the transverse groove 11 of the anvil 8 after having completely severed the insulating sheath and the conductor of the insulated wire F. During this same movement, the knives 28 and 29 will co-operate with the knives 9, 10 to cut the insulating sheath, but not the electrical conductor, of the wire F.

FIG. 7 shows the tool in his intermediate state. It will be seen from this Figure that during the displacement of the movable block 20, the struts 33, 34 do not transmit any movement because of the elongate slots 36 which ensure that struts 33, 34 move only when the pivot pins 35 reach the other end (bottom end, as viewed) of these elongate slots. This movement constitutes a lost motion or idle stroke of the connecting elements which corresponds in time to the active "stroke" of the cams 21.

As the handles 3, 4 are further squeezed together, the cams 21 serve only to maintain the position of the movable block 20 against the fixed block 7, while the struts 33, 34 transmit the pivotal movement of the handles 3, 4 to the arms 26, 27. This in turn causes the knives 28 and 29 respectively to pivot towards the outside, as is indicated by the arrow f in FIG. 5, about their respective pivot pins 30, 31. As the knives 28, 29 are engaged in the thickness of the insulating sheath, they push the latter, together with the conductor, towards the outside. The conductor is easily separated from the sheath stubs which have been retained, on the one hand, between the stationary knife 9 and the blade 25 and, on the other hand, the stationary knife 10 and the same blade 25.

The withdrawal movement of the insulated wire F from one side of the cutter to the other under the pressure of the pivoting knifes 26, 27 is facilitated by the guide grooves 16, 18 or 17, 19. The curvature of these grooves in the longitudinal direction has a radius, with a center at the pivot pin 30 or 31, equal to that of the circular arc described by the pivoting movement of the knives 26, 27, as can be seen best on FIG. 5. and and, knife and 25.

When it is desired to strip thin wire over a short length, the guide grooves, and consequently the extensions of the block 7, are dispensable. They are, however, necessary as soon as one is concerned with thicker wire, or where the desired stripped length is more extensive.

The final state of the tool is shown in FIG. 8. From that position the handles 3, 4 are released, and the two stripped ends of the severed wire will then disengage from the tool while the movable parts of the latter return to their initial position.

When the handles 3, 4 are completely squeezed together (FIG. 8) the half-openings 41 are joined and can be used to crimp a metallic ferrule into which one stripped end of the wire F has been inserted.

It will be noted that the described construction provides a light, not at all cumbersome, and easy-to-manipulate tool through which time is saved, particularly for the preparation of predetermined lengths of insulated wire both of whose ends must be stripped.

Although the mechanism and the tool of this invention is designed for the simultaneous stripping of both ends of a wire, it will be noted that one may equally easily strip, as with conventional wire cutters and strippers, only one end of an already severed wire. It then suffices to insert the wire into the tool until its insulated end is disposed in the plane of the blade 8. In fact, the blade 8 remains inoperative, but the knives 9 and 28 co-operate to cut the sheath and to push the stripped end outside the tool.

Of course, a construction on a larger scale for the severing and stripping of bigger cables will no longer be a hand-operated wire cutter but a machine with legs or with a motor, without departing from the scope of the invention.

I claim:

1. A mechanism for severing and simultaneously stripping a wire covered with a sheath, comprising a support, a stationary shearing block rigidly secured to said support, a pair of spaced-apart severing elements on said block, a movable shearing block for movement into wire-gripping engagement with said stationary block and away therefrom, a cutting element on said movable block, cooperating cutting means on said stationary block, between said severing elements, for cooperation with said cutting element, to sever the wire, actuating means on said support for effecting the movement of said movable block, a pair of spaced apart stripping elements mounted on said movable block for movement therewith and for movement relative thereto, biasing means for preventing said relative movement of the stripping elements, and means for connecting said actuating means with said stripping elements in such a way that, during said movement of the movable block into said wire-gripping and into severing engagement with said stationary block, said relative movement of the stripping elements does not take place but thereafter said stripping elements move relative to said movable block in a direction away from said cutting elements to strip the ends of the severed wire.

2. The mechanism as defined in claim 1, wherein said cooperating cutting means is in the form of an anvil.

3. The mechanism as defined in claim 1, further comprising movement-transmitting means interposed between said actuating means and said movable block.

4. The mechanism as defined in claim 1, wherein said movable block has a central body on which said cutting element is mounted, and a pair of lateral arms carrying said stripping elements, and further comprising pivot means on said central body for mounting said lateral arms and enabling the latter to effect a pivotal movement away from said cutting element.

5. The mechanism as defined in claim 4, wherein said stationary block is laterally extended on at least one side of said severing elements, arcuate guide grooves being formed in each such extension for engagingly receiving wires of different diameters, the radius of curvature of said grooves being substantially the same as that of the pivotal movement of said stripping elements carried by said lateral arms.

6. The mechanism as defined in claim 5, wherein said severing elements include a plurality of arcuate severing edges of different curvatures, said edges being associated with one of said grooves, having substantially the same curvature.

7. The mechanism as defined in claim 1, wherein said actuating means is plier-like and hand operated.

8. The mechanism as defined in claim 7, wherein said connecting means includes a lost-motion device.

9. The mechanism as defined in claim 8, further comprising a pair of handles associated with said actuating means, and wherein said lost-motion device is constituted by a connecting rod associated with said handles, and pins carried on said handles and engageably received in an elongate cam slot in the associated connecting rod, the arrangement being such that said connecting means has an idle stroke when said handles are actuated to move said movable block towards said stationary block.

10. The mechanism as defined in claim 7, wherein said actuating means is constituted by a pivot on which is mounted a pair of biased-apart handles.

11. The mechanism as defined in claim 10, wherein said handles terminate in cam elements, further comprising a cam follower on said movable block, said cam elements and said cam follower constituting movement-transmitting means.

12. The mechanism as defined in claim 10, further comprising a finger mounted for pivotal movement towards the outside of the tool and around a pivot carried by said support, and a spring for urging said finger against a grooved face of an extension of said stationary block.

* * * * *

UNITED STATES PATENT OFFICE
CERTIFICATE OF CORRECTION

Patent No. 3,731,561   Dated May 8, 1973

Inventor(s) EMILE R. MONGREDIEN

It is certified that error appears in the above-identified patent and that said Letters Patent are hereby corrected as shown below:

On the cover sheet, insert -- [30] France   May 26, 1970   7019137 -- .

Signed and sealed this 22nd day of January 1974.

(SEAL)
Attest:

EDWARD M. FLETCHER, JR.
Attesting Officer

RENE D. TEGTMEYER
Acting Commissioner of Patents